United States Patent [19]

Yatsurugi et al.

[11] 3,785,122

[45] Jan. 15, 1974

[54] PROCESS FOR PREPARING 4,5A ZEOLITE AND METHOD FOR SEPARATING MIXTURES USING SAME

[76] Inventors: Yoshifumi Yatsurugi, 6-507 7-ban, 2-chome, Tsujido, Nishikai-gun, Fujisawa; Tatsuo Kuratomi, 2-18, 4-chome, Hamatake, Chigasaki; Tetsuo Takaishi, 1461-251, Nagae, Hayamacho, Miuragun, Kanagawa, all of Japan

[22] Filed: Jan. 27, 1972

[21] Appl. No.: 221,431

[52] U.S. Cl. .................................. 55/75, 423/328
[51] Int. Cl. ............................................ B01d 53/04
[58] Field of Search .............................. 55/75, 389; 208/DIG. 2; 252/455 Z; 423/328

[56] References Cited
UNITED STATES PATENTS

| | | | |
|---|---|---|---|
| 3,218,367 | 11/1965 | Chen | 55/75 |
| 2,882,243 | 4/1959 | Milton | 55/75 |
| 3,369,865 | 2/1968 | Mattox et al. | 423/328 |

*Primary Examiner*—Charles N. Hart
*Attorney*—Otto John Munz

[57] ABSTRACT

This invention is concerned to a process of preparing a novel kind of A-type zeolite having specific molecular sieving actions and a method of using said zeolite to separate a mixture of substances into substances having a different adsorption effective cross-sectional area.

4 Claims, No Drawings

PROCESS FOR PREPARING 4.5A ZEOLITE AND METHOD FOR SEPARATING MIXTURES USING SAME

This invention relates to a process for preparing novel 4.5A zeolite and a method for separating and purifying object substances from mixtures using the said zeolite.

There are a variety of natural and artificial zeolites, and A-type zeolite is a typical one. And, the A-type zeolite is represented by its sodium salt (hereinafter referred to as Na-A type zeolite), having the chemical composition of $Na_{12}(AlO_2 \cdot SiO_2)_{12}(NaAl_{+2}) \delta \cdot XH_2O \cdot$ (wherein $0 \leq \delta \leq 1$, and X is a variable integer.) The molecule ($NaAlO_2$) in the formula is contained in the sodalite unit and has almost no effect on the adsorptive and catalytic characteristics of zeolite, and further it is chemically stable with little tendency to ion exchange. On the other hand, 12 sodium atoms are active and facilitate the ion exchange. The absorptive and catalytic characteristics of zeolite are remarkably affected by the kind of ion introduced. For instance, K-A type zeolite is formed by substituting most of the sodium by potassium, and Ca-A type zeolite is formed by substituting by calcium. The former and latter zeolites have pore openenings of about 3 and 5 angstrom, respectively, whereas that of Na-A zeolite is about 4 angstrom. More particularly, by substituting the exchangeable sodium in Na-A zeolite by one kind of cations having no more than three valences a zeolite is formed similar to the above-mentioned K-A type and Ca-A type zeolites having the molecular sieve action characteristic of the replaced cation. The 12 sodium ions are shared by eight 6-membered oxygen rings and four 8-membered oxygen rings contained in the unit lattice of A-type zeolite, and the molecuar sieve action varies depending on the kind of ion which has replaced the four sodium ions shared by the 8-membered oxygen rings. However, exact physicochemical mechanism has not been elucidated so far in what order these twelve sodium ions are replaced by other cations and on what difference is caused in the properties of zeolite depending on the kind of cations replaced.

On the other hand, there are many molecules which are impossible to separate using the three kinds of A-type zeolites represented by Na-A type, Ca-A type, and K-A type. The advent of a zeolite having an intermediate absorptive characteristics of Na-A type and Ca-A type has been waited for.

It is an object of this invention to provide a process for preparing a novel A-type zeolite for industrial use having a novel molecular sieving action.

Another object of this invention is to provide a method to separate a mixture of substances which are not adsorbed by Na-A type zeolite but adsorbed by Ca-A type zeolite into two substances having large and small adsorption effective cross-sectional areas.

According to this invention, the aforesaid novel A-type zeolite is prepared by bringing A-type zeolite into contact with solutions containing potassium ions and zinc ions, simultaneously or successively, to allow the ion exchange of ion-exchangeable cations in said A-type zeolite, so that about 16.7 to 33.3 percent of said ion-exchangeable cations is exchanged by potassium ions and about 66.7 to 83.3 percent of said ion-exchangeable cations is exchanged by zinc ions in an equilibrium state of ion exchange.

This A-type zeolite has an intermediate characteristic of Na-A type zeolite (4A) and Ca-A type zeolite (5A). It is one that should be called 4.5A zeolite. The aforesaid exchange ratio is the equivalent ratio expressed in percentage.

The studies on cation exchange of the aforesaid known Na-A type zeolite indicate that when about 16.7 percent of exchangeable sodium ions in said Na-A type zeolite in an equilibrated state of ion exchange the adsorptive characteristic inherent to the exchanged cations begins to appear and it is completed when the exchange of about 33.3 percent has been finished. However, it has been found that Na-A type zeolite treated with a solution containing potassium ions and then with a solution containing divalent cations exhibits the different characteristic from the above. For instance, in the case of an Na-A type zeolite in which more than 90 percent of exchangeable sodium ions has been exchanged by potassium ions and further by divalent cations in an equilibrated state of ion exchange, the effect of the exchanged divalent cations appeares when the ion exchange ratio exceeds about 66.7 percent. When the ion exchange ratio increases further, difference appears depending on the kind of the divalent cations exchanged. For instance, calcium ions exhibit the characteristic inherent to Ca-a type zeolite at the ion exchange ratio above about 66.7 percent whereas zinc ions exhibit an intermediate characteristic of Na-A type zeolite and Ca-A type zeolite at the same ion exchange ratio and exhibit the characteristic similar to Ca-A type zeolite at the ion exchange ratio above about 83.3 percent.

As has been mentioned above, the ion exchange in this invention may be accomplished consecutively or simultaneously. It is recommended that the ion exchange be complete until an equilibrated state of exchange is reached; otherwise a mixture containing substances with different ion exchange stages is formed and definite characteristic is not obtained.

The embodiments of this invention are described into detail. The ion exchange was accomplished by keeping Na-A type zeolite in contact with an aqueous solution of chloride or nitrate of cation to be exchanged for 12 hours at 80°C. The zeolite and solution after the ion exchange were anlyzed by ordinary chemical analysis and atomic absorption spectrophotometry to determine the exchange ratio of each cation. Further, the structure of ion-exchanged A-type zeolite was confirmed by the powder X-ray diffractometry. The A-type zeolite treated for ion exchange was activated prior to use at 400°C in the air.

Although it is impossible to determine exactly the diameter of pore openings of 4.5A zeolite according to this invention, it has an intermediate size of Na-A type zeolite and Ca-A type zeolite, as will be described into detail in the examples. The adsorption of substances varies remarkably depending on the polarity as well as the geometrical structure of substances to be separated. The mixture to be separated according to this invention consists of components: which are not adsorbed by Na-A type zeolite but adsorbed by Ca-A type zeolite, in other words, they have effective cross sections larger than the diameter of pore openings of Na-A type zeolite but smaller than the diameter of pore openings of Ca-A type zeolite.

The invention will be described into detail based on the following examples. Table 1 shows the adsorption characteristics of 4.5A zeolite in which sodium ions are exchanged by zinc ions 75 percent and potassium ions 25%. It is noted that diborane and nitrogen are not practically adsorbed. On the other hand, the 4.5A zeolite exhibits an adsorption characteristic for hydrocarbons similar to that of Ca-A type zeolite, which is known to adsorb diborane and nitrogen under the conditions as specified in Table 1.

TABLE 1

| Absorbate | Temperature (°C) | Partial pressure (Tor) | Absorbed amount: mg of absorbate per 1 g of 4.5A |
|---|---|---|---|
| Diborane | 0 | 150 | < 2 |
| Monosilane | 0 | 160 | 55 |
| Germane | 0 | 120 | 37 |
| n-Butane | 0 | 220 | 110 |
| Nitrogen | −195 | 200 | < 2 |
| cis-2-Butene | 0 | 50 | 98 |
| trans-2-Butene | 0 | 50 | 120 |

Arsine and phosphine are also adsorbed well, although they are not listed in the above table. Thus, the aforesaid 4.5A zeolite is apparently extremely effective for separating and purifying diborane. Now, Table 2 shows the adsorption characteristics of 4.5A zeolite in which sodium ions are exchanged by zinc ions 68 percent and potassium ions 32 percent.

TABLE 2

| Absorbate | Temperature (°C) | Partial pressure (Tor) | Absorption per 1 g of 4.5A |
|---|---|---|---|
| Diborane | 0 | 140 | < 2 |
| Monosilane | 0 | 160 | 25 |
| Germane | 0 | 120 | < 2 |
| n-Butane | 0 | 220 | 105 |
| cis-2-Butene | 0 | 50 | 35 |
| trans-2Butene | 0 | 50 | 115 |
| Arsine | 0 | 25 | 30 |
| Phosphine | 0 | 20 | 105 |

It is noted in Table 2 that the adsorption of germane and cis-2-butene is extremely reduced as compare with that in Table 1. Thus, this 4.5A zeolite is suitable for separation and purification of germane, cis-2-butene, and trans-2-butene. This 4.5A zeolite can be applied to the separation of liquefied gases as well as gaseous substances, although no data is given in the above table.

With 4.5A zeolite it has become possible to separate and purify mixtures which were impossible to separate with conventional methods.

What is claimed is:

1. A method for separating a mixture of substances which are not adsorbed by Na-A type zeolite but adsorbed by Ca-A type zeolite into two substances having large and small adsorption effective cross sections, by treating said mixture with the 4.5A zeolite prepared by exchanging active cations in 4A type zeolite with potassium ions and zinc at about 16.7 to 33.3 percent and about 83.3 to 66.7 percent, respectively.

2. A method as claimed in claim 1 wherein 4.5 A zeolite with 75 percent zinc ions and 25 percent potassium ions exchanged is used to separate diborane from a mixture thereof with one or more of monosilane, germane, arsine, phosphine, and straight chain hydrocarbon.

3. A method as claimed in claim 1 wherein 4.5 ziolite with 68 percent zinc ions and 32 percent potassium ions exchanged is used to separate diborane and germane from a mixture thereof with one or more of monosilane, arsine, phosphine, and straight chain hydrocarbon.

4. A method as claimed in claim 3 wherein 4.5 A zeolite as claimed in claim 8 is used to separate cis-2-butene from n-butane.

* * * * *

UNITED STATES PATENT OFFICE
CERTIFICATE OF CORRECTION

Patent No. 3,785,122          Dated January 15, 1974

Inventor(s) Yoshifum Yatsurugi, et al.

It is certified that error appears in the above-identified patent and that said Letters Patent are hereby corrected as shown below:

On the cover sheet in the heading insert -- 30 Foreign Application Priority Data:

March 31, 1971    Japan    18396/46

October 2, 1971    Japan    76816/46 --.

Signed and sealed this 30th day of April 1974.

(SEAL)
Attest:

EDWARD M. FLETCHER, JR.        C. MARSHALL DANN
Attesting Officer              Commissioner of Patents

UNITED STATES PATENT OFFICE
CERTIFICATE OF CORRECTION

Patent No. 3,785,122      Dated January 15, 1974

Inventor(s) Yoshifumi Yatsurugi et al.

It is certified that error appears in the above-identified patent and that said Letters Patent are hereby corrected as shown below:

Column 4, line 33, "as claimed in claim 5" should read -- as claimed in claim 3 --.

Signed and Sealed this twenty-sixth Day of August 1975

[SEAL]

Attest:

RUTH C. MASON
*Attesting Officer*

C. MARSHALL DANN
*Commissioner of Patents and Trademarks*